United States Patent
Kuo et al.

(10) Patent No.: US 12,554,045 B2
(45) Date of Patent: Feb. 17, 2026

(54) ANTI-SCATTERING AND ANTI-INTERFERENCE COATING PATTERN STRUCTURE OF AN OPTICAL FILM

(71) Applicant: MORRISON OPTOELECTRONICS LTD., Taipei (TW)

(72) Inventors: Chin-Chen Kuo, Taipei (TW); Sheng-Wei Wang, Taipei (TW); Tsung-Hsiu Wu, Taipei (TW); Yun-Hui Tai, Taipei (TW)

(73) Assignee: MORRISON OPTOELECTRONICS LTD., Taipei (TW)

( * ) Notice: Subject to any disclaimer, the term of this patent is extended or adjusted under 35 U.S.C. 154(b) by 413 days.

(21) Appl. No.: 18/187,925

(22) Filed: Mar. 22, 2023

(65) Prior Publication Data

US 2024/0319408 A1   Sep. 26, 2024

(51) Int. Cl.
 *G02B 1/10* (2015.01)
 *G02B 5/00* (2006.01)
 *G03F 1/38* (2012.01)

(52) U.S. Cl.
 CPC .............. *G02B 1/10* (2013.01); *G03F 1/38* (2013.01); *G02B 5/005* (2013.01)

(58) Field of Classification Search
 None
 See application file for complete search history.

(56) References Cited

U.S. PATENT DOCUMENTS

| | | | | |
|---|---|---|---|---|
| 11,846,777 B2 * | 12/2023 | Olkkonen | .............. | G02B 27/42 |
| 2004/0246599 A1 * | 12/2004 | Nilsen | .................. | G02B 6/0053 359/831 |
| 2005/0024745 A1 * | 2/2005 | Gasloli | ............... | C03C 17/3649 359/738 |
| 2014/0357012 A1 * | 12/2014 | Toriyama | ............. | G02B 5/0268 216/13 |

* cited by examiner

*Primary Examiner* — Ryan Crockett
(74) *Attorney, Agent, or Firm* — BACON & THOMAS, PLLC

(57) ABSTRACT

An anti-scattering and anti-interference coating pattern structure of an optical film, wherein an optical film is formed on a substrate, the characterize is: the periphery of the optical film is a non-straight zigzag lines or multi-curved inner edge lines, such that can be used to reduce stray light affecting the sensing area when it is used in light-sensing components.

11 Claims, 10 Drawing Sheets

ANTI-SCATTERING AND ANTI-INTERFERENCE COATING PATTERN STRUCTURE OF AN OPTICAL FILM

BACKGROUND OF THE INVENTION

Field of the Invention

The present invention relates to an optical film, particularly to an optical film with anti-scattering and anti-interference coating pattern structure.

Description of the Related Art

The film material is a thin metal or organic substance with a thickness between several nanometers and several millimeters. The electronic semiconductor functional devices and optical films are the main applications of thin film technology. It can be seen that if the optical film materials (such as for reducing/eliminating reflection materials, etc.) are composed of several thin layers with different thicknesses and different reflectivity, their optical properties can be enhanced. The thickness of the film needs to be within the wavelength range of visible light. Due to the difference in refractive index between substances, the film in this range can have significant refractive characteristics. These effects are called thin-film interference. Thin-film interference will affect the refraction and light transmission characteristics of optical materials. In manufacturing, the thin film layers can be produced by depositing one to multiple layers of thin films on a substrate (usually glass), and the process generally uses physical vapor deposition or chemical vapor deposition such as evaporation or sputtering deposition, or atomic layer deposition (ALD). In applications, there are optical filters (dichroic filters), dielectric mirrors, wafer substrates, semiconductor components, solar cells, appliances for medical care, beauty, people's livelihood, etc.

As shown in FIGS. 1A and 1B, the common optical film is manufactured by placing the substrate 100 on the fixture 110, and after the substrate 100 is fixed on the fixture 110, the surface of the substrate 100 is sputtered or evaporated to obtain an optical film 200 to be formed on the surface of the substrate 100 However, when light passes through the optical film, strong reflected light will be generated on the coating line 210 around the optical film, which will affect the light sensing element, resulting in poor image quality, and even ghost images (glare) that will affect the picture image.

In order to improve the above-mentioned condition, some people in the subject field have tried to use a substrate with a larger area, as shown in FIG. 2, to form an optical film on a large-area substrate, so that the coating line on the edge of the coating is away from the photosensitive element, that is, the reflective area 310 around the photosensitive element 300 is enlarged to reduce the influence of strongly reflected light on the photosensitive element 300 However, due to the development of miniaturization of electronic components, the substrate cannot be enlarged infinitely, and the method of enlarging the reflective area cannot completely solve the problem of interference caused by strong reflected light, but instead it increases the cost of electronic components.

As shown in FIGS. 3A and 3B, another company of the subject field had proposed to add a second substrate 500 above the first substrate 400 on which the optical film 410 is formed on the surface, and to make an annular mask 510 on the surface of the second substrate 500. After bonding the first substrate 400 and the second substrate 500, the annular mask 510 then can shield the peripheral coating line 420 of the optical film 410. However, although this method can shield the coating line 420, when the light passes through the inner edge line 520 of the annular cover 510, it will also generate strong reflection light, which still cannot solve the problem of light interference.

That is, when the light passes through the coating line on the edge of the optical film to generate strong reflection light, the captured image will have a ghost image or light jump phenomenon as shown in FIG. 4 or FIG. 5.

In view of the above, the research team of the applicant company have made great effort to conduct research and improvement. After many tests and improvements, the optical film of anti-scattering and anti-interference coating pattern structure of the present invention was finally produced.

SUMMARY OF THE INVENTION

Thus, the present invention is objected to provide an optical film anti-scattering and anti-interference coating pattern structure, which makes the coating line of the optical film non-linear so as to improve the excessively strong problems of the reflected light.

According to the anti-scattering and anti-interference coating pattern structure of the optical film of the present invention, the coating line is a non-linear zigzag line or a multi-curve after patterning, then the intensity of reflected light is reduced, which is an another object of the present invention.

According to the anti-scattering and anti-interference coating pattern structure of an optical film of the present invention, the coating line of the optical film is a graphic design, which can be applied to any substrate, including substrates such as glass, quartz, wafer, sapphire or blue glass, this is an additional purpose of the present invention.

According to the anti-scattering and anti-interference coating pattern structure of an optical film of the present invention, the non-linear patterned coating line can be applied to any optical film, including an optical film with a thickness of more than 1 nm or an optical film with more than one layer, which is a further object of the present invention.

According to the anti-scattering and anti-interference coating pattern structure of the optical film of the present invention, the non-linear patterned coating line of the optical film can be various triangles, various rectangles, semicircles or polygons, etc., which is another object of the present invention.

According to the anti-scattering and anti-interference coating pattern structure of the optical film of the present invention, after the coating line of the optical film is patterned, the generation of ghost images (jumping light) can be avoided, and the picture quality can be improved, which is another main object of the present invention.

As for the anti-scattering and anti-interference coating pattern structure of the optical film of the present invention, its detailed structure and specific embodiments can be fully understood with reference to the following descriptions made in accordance with the accompanying drawings.

FIB. 2 is a schematic diagram of the conventional art of a larger substrate to enlarge the reflective area.

Figure 1A:
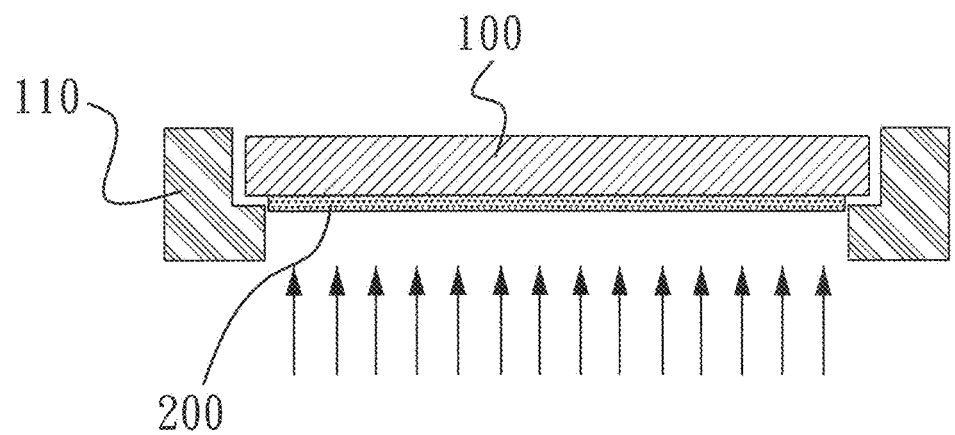
FIG. 1A is a schematic cross-sectional view of placing a substrate on a fixture for coating of prior art.
Figure 1B:
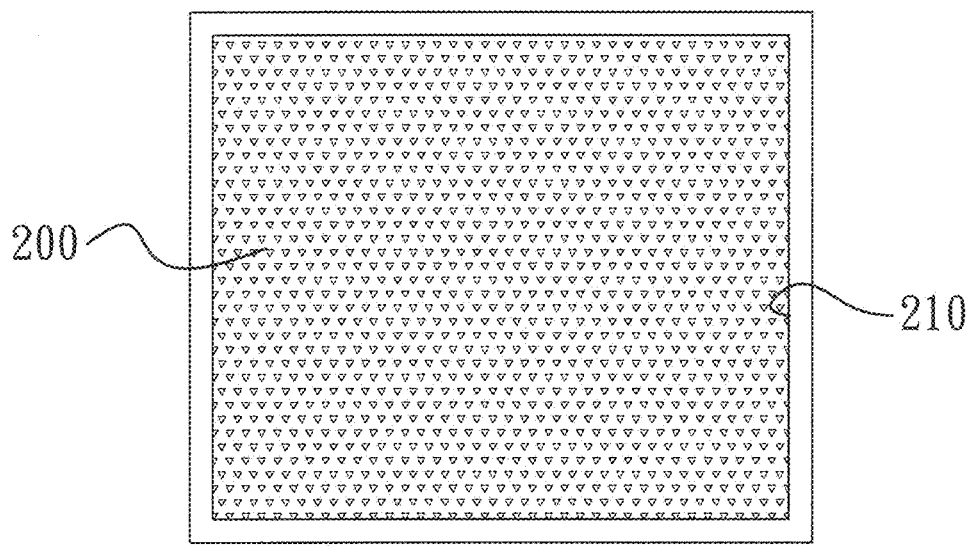
FIG. 1B is a schematic plan view of an optical film commonly formed on a substrate of prior art.
Figure 2:
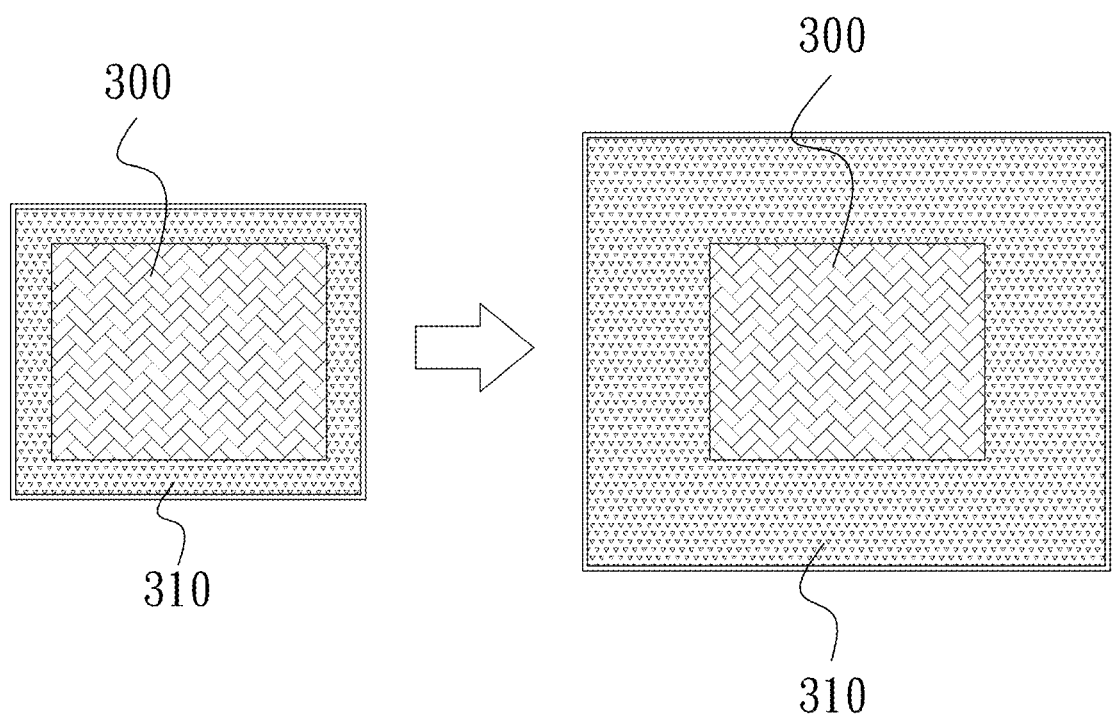
Figure 3A:
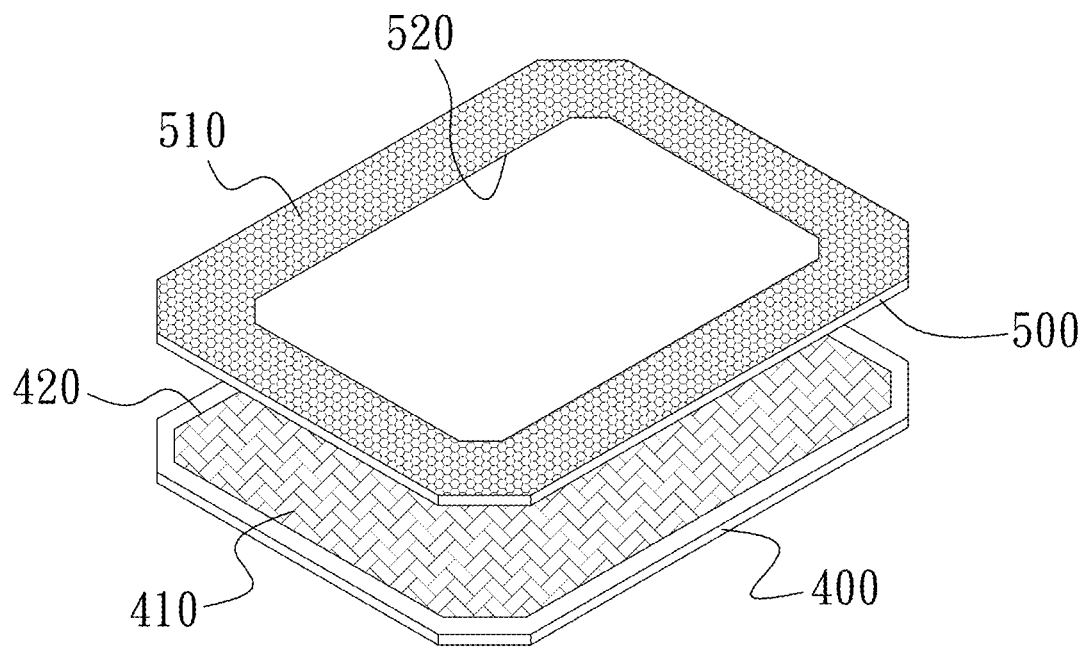

FIG. 3A is a three-dimensional exploded schematic diagram of a conventional two-piece substrate covering a ring-shaped mask around the optical film of a conventional art.

Figure 3B:
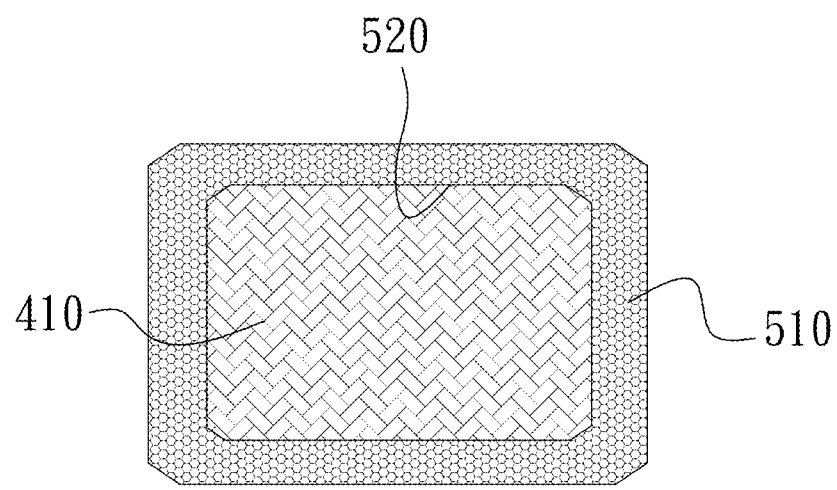

FIG. 3B is a schematic plan view of the two substrates in FIG. 3A after lamination.

Figure 4:

FIG. 4 is an image shot using a conventional optical film.

Figure 5:
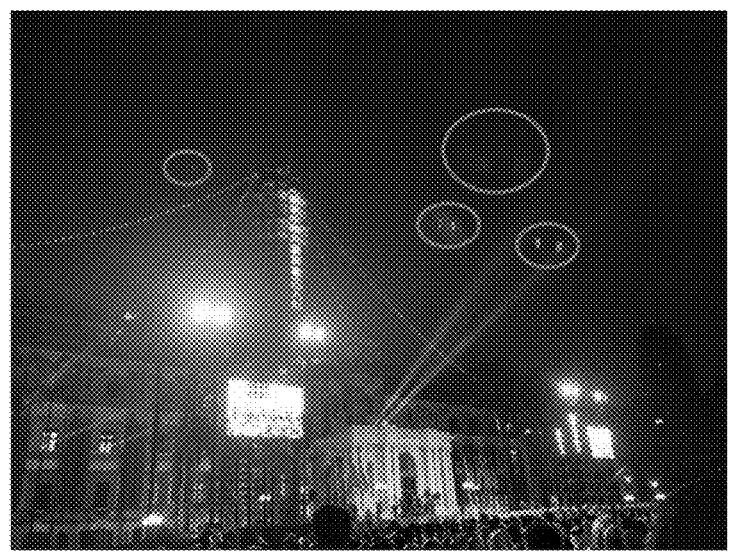

FIG. 5 is another image taken using an another conventional optical film.

Figure 6:
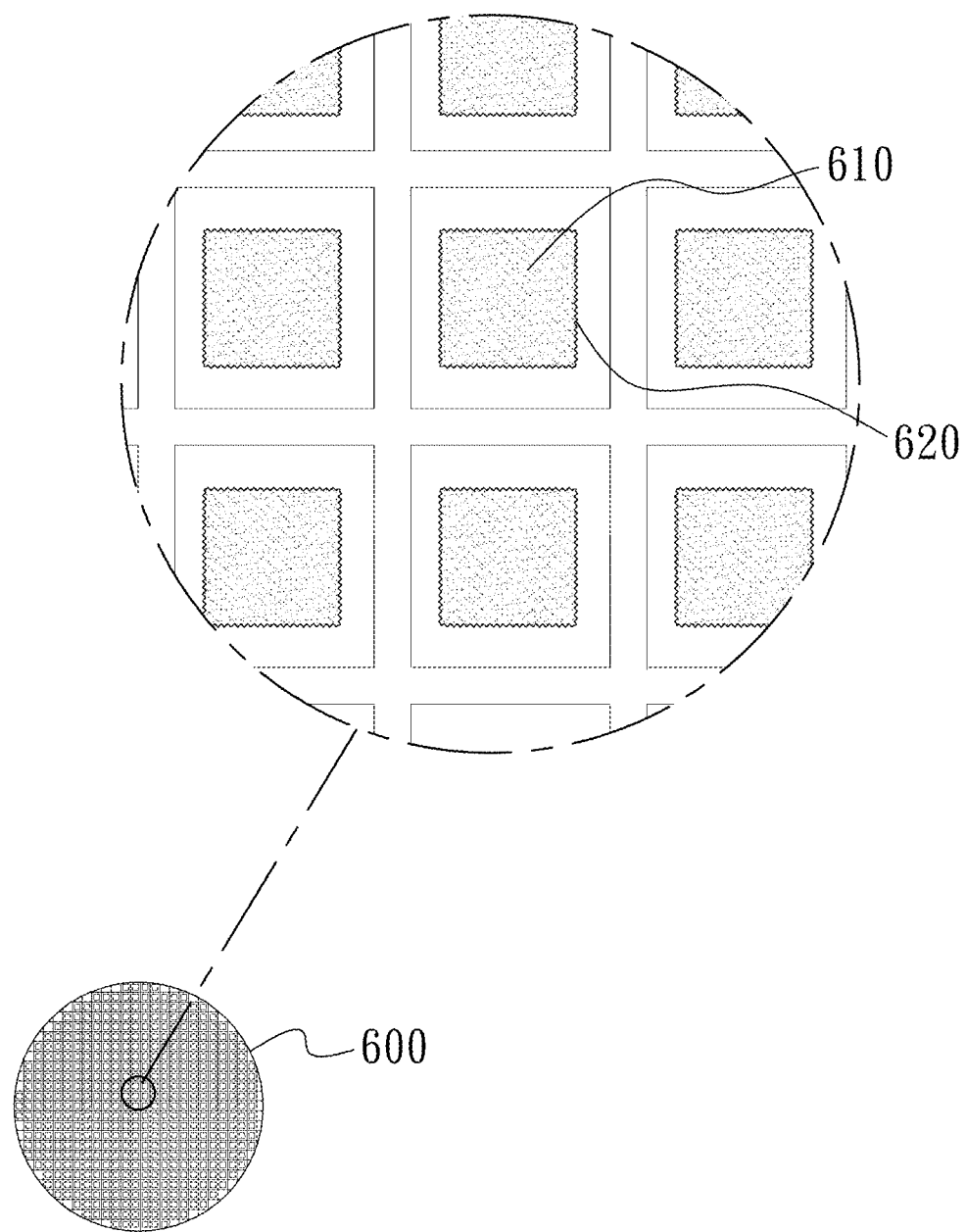

FIG. 6 is an implementation diagram of the anti-scattering and anti-interference coating pattern structure of the optical film of the present invention and a partially enlarged diagram.

Figure 7A:
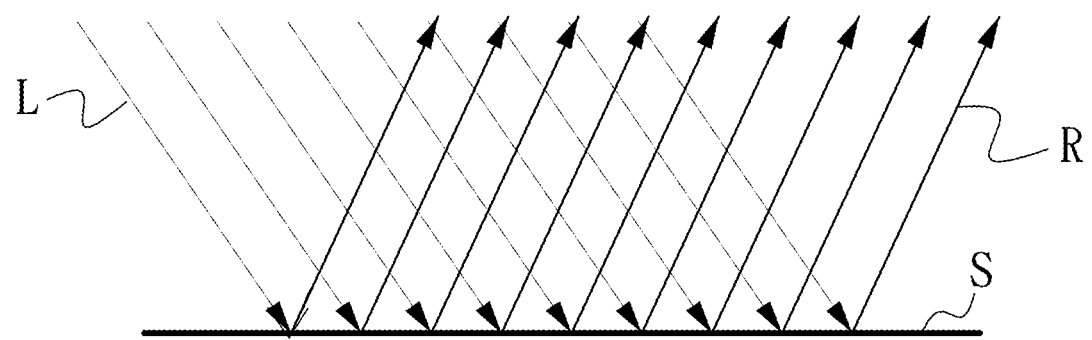

FIG. 7A is a schematic diagram of conventional incident light and reflected light on a straight edge of conventional optical film.

Figure 7B:
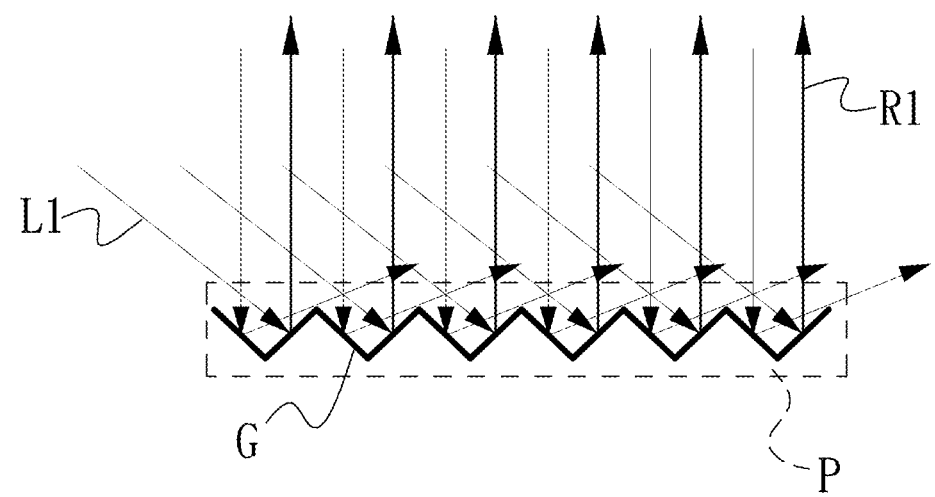

FIG. 7B is a schematic diagram of the incident light and reflected light on the zigzag edge of the anti-scattering and anti-interference coating pattern structure of the optical film of the present invention.

Figure 8:
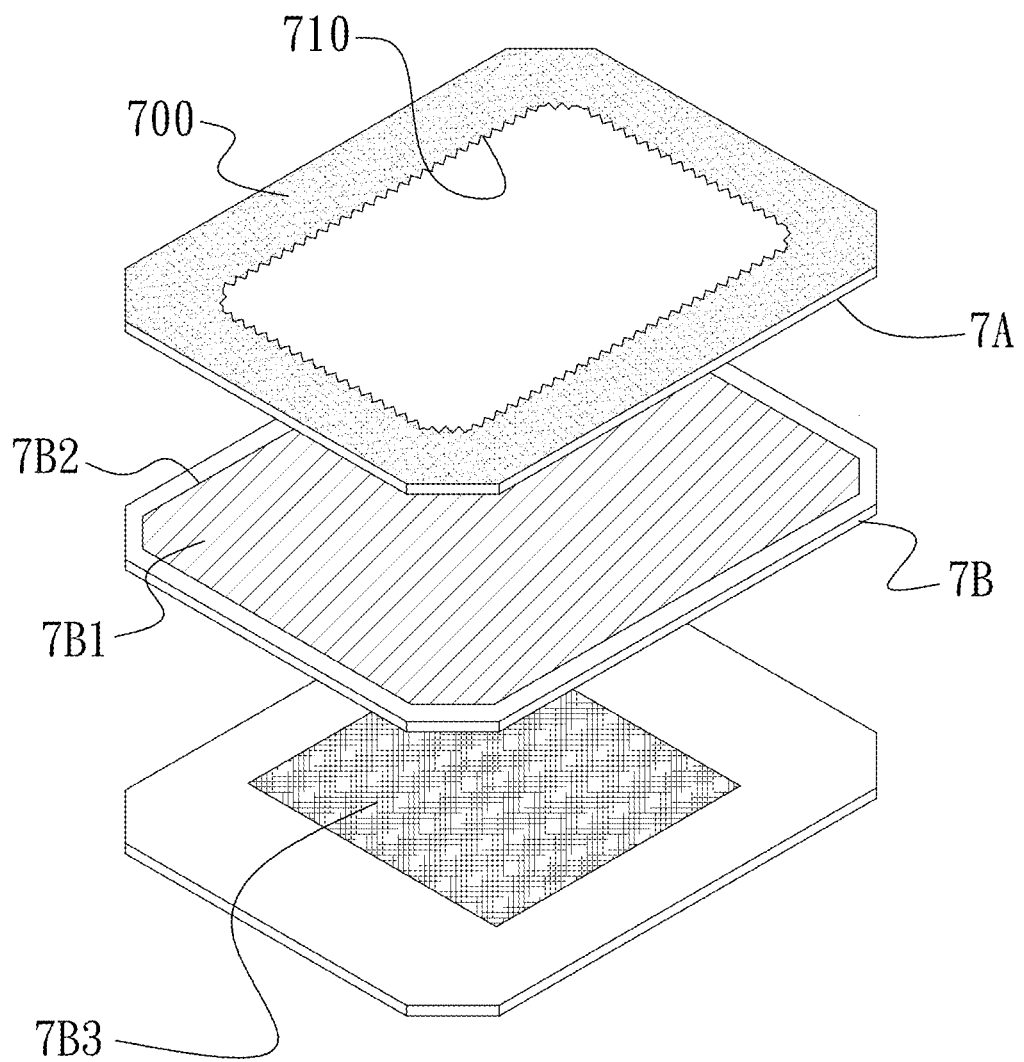

FIG. 8 is a three-dimensional exploded schematic diagram of another embodiment of the anti-scattering and anti-interference coating pattern structure of the optical film of the present invention.

Figure 9:
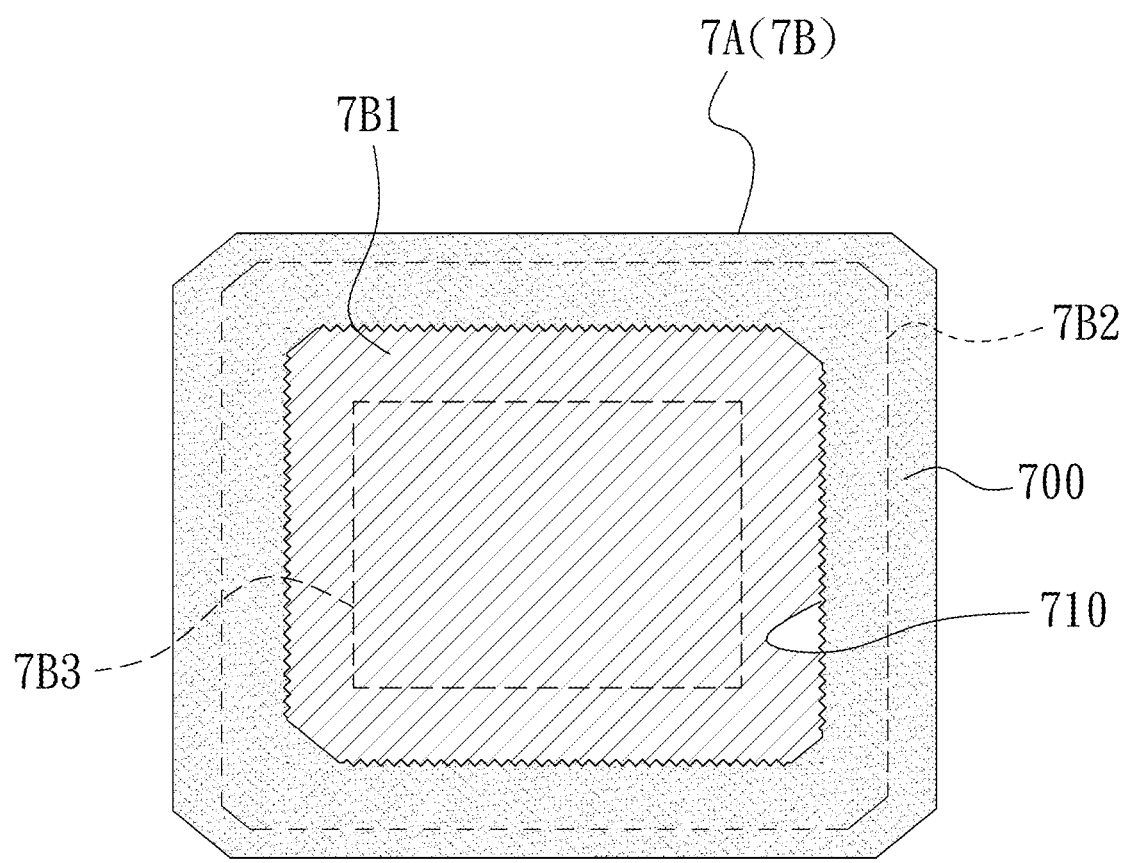

FIG. 9 is a schematic plan view of the embodiment shown in FIG. 8.

Figure 10A:
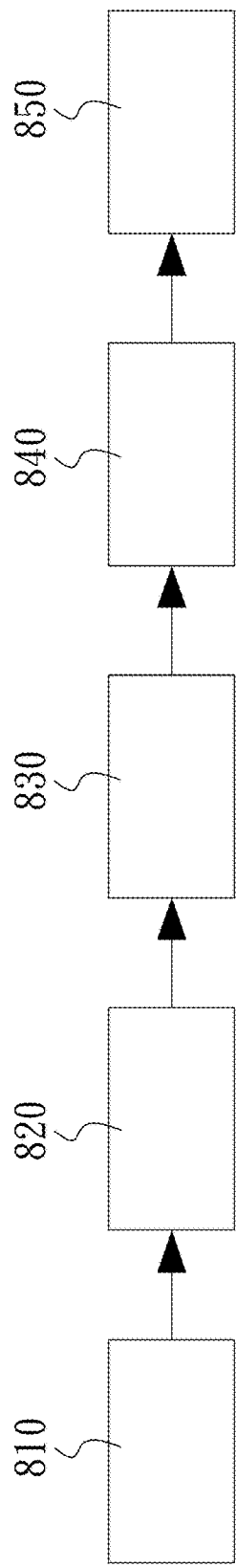

FIG. 10A is a block diagram of the process for manufacturing the annular mask of the anti-scattering and anti-interference coating graphic structure of the optical film of the present invention.

Figure 10B:
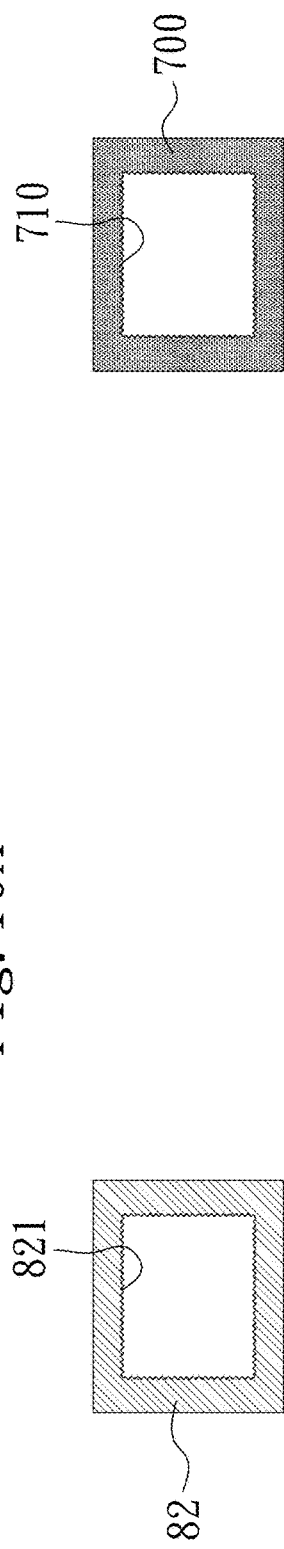

FIG. 10B is a cross-sectional view of the process for manufacturing the annular mask of the optical film anti-scattering and anti-interference coating pattern structure of the present invention.

Figure 11:
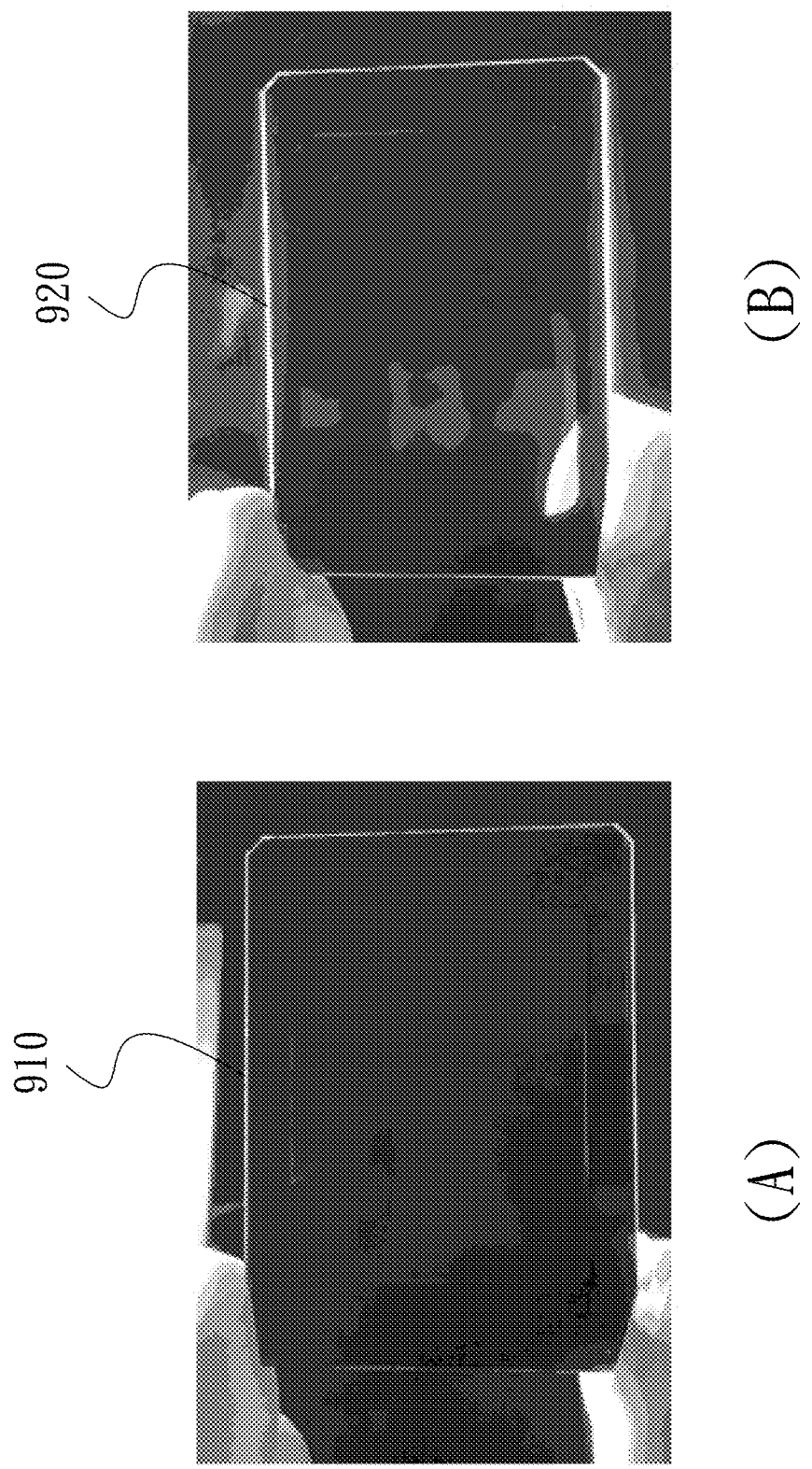

FIG. 11 is an image comparison diagram of the peripheral coating line of the optical film as a straight line and a zigzag.

DETAILED DESCRIPTION OF PREFERRED EMBODIMENT

As shown in FIG. 6, a preferred embodiment of the optical film of anti-scattering and anti-interference coating pattern structure of the present invention, is to form at least one optical film 610 on a substrate 600, the peripheral coating line 620 of the optical film 610 is a patterned coating line, and the patterned coating line is a non-linear zigzag line or a multi-curved line..

Please refer to FIG. 7A and FIG. 7B, which respectively showing the schematic diagrams when the light hits the linear side or the zigzag side. As shown in FIG. 7A, when the incident light L hits the straight side S, there is no interference between the incident light L and the reflected light R, so it will cause strong reflected light. As shown in FIG. 7B, when the incident light L1 hits the zigzag side G, the incident light L1 and the reflected light R1 will interfere with each other in the interference area P of the zigzag side G, and the intensity of the reflected light will be reduced, so it can reduce the impact on the photosensitive element. Moreover, the zigzag edge G can be further designed to control the direction of incident light and reflected light, so as to minimize the impact on the photosensitive element.

Therefore, the anti-scattering and anti-interference coating pattern structure of the optical film of the present invention can be used to control the direction of incident light and reflected light and can effectively reduce the intensity of reflected light and reduce the impact of stray light on the sensing area.

Please refer to FIGS. 8 and 9, which respectively shows another preferred embodiment of the optical film of anti-scattering and anti-interference coating pattern structure of the present invention. As shown in the figures, it can be placed on a second substrate 7A an annular mask 700 formed around the surface of the mask 700, and the inner edge of the annular mask 700 is a non-linear zigzag inner edge line 710. In this way, when the second substrate 7A is attached to the first substrate 7B with the optical film 7B1 formed on its surface, the annular mask 700 has to cover the peripheral coating line 7B2 of the optical film 7B1. In this way, when the incident light hits the bonded substrate, the intensity of reflected light can be reduced through the zigzag inner edge line 710 of the annular mask 700, thereby reducing the influence of stray light on the sensing region 7B3.

Please refer to FIGS. 10A and 10B, in the optical film of anti-scattering and anti-interference coating graphic structure of the present invention, the annular mask with the patterned inner edge line can be formed on the substrate through the yellow light lithography process, it includes: a photo-resist coating step 810, an exposure step 820, a developing step 830, a film coating step 840 and a film removal step 850. Wherein, before performing the photo-resist coating step 810, the substrate needs to be cleaned first, and then the surface of the substrate 7a is covered with photo-resist 81; in the exposing step 820, a photo-mask 82 having a zigzag inner edge line 821 is used to pair the photo-resist 81 for exposure; the development step 830 is to leave the predetermined pattern photo-resist 83; the coating step 840 is to coat the dark film 84 on the substrate 7a, and the dark film 84 covers the predetermined pattern photo-resist 83; the film removal step 850 is to remove the predetermined pattern photo-resist 83 and the dark film above it, and finally form an annular mask 700 with a zigzag inner edge line 710 on the substrate 7a.

Figure 10B:
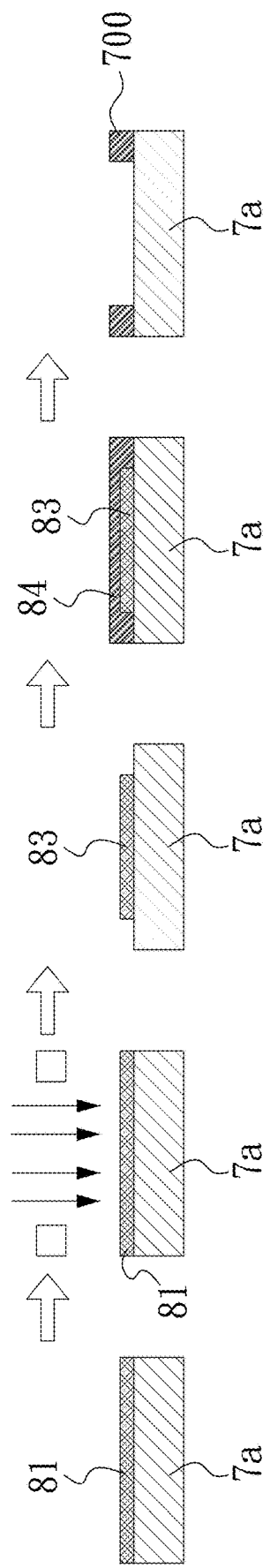

For the anti-scattering and anti-interference coating pattern structure of the optical film of the present invention, under the condition that the light source is 150 Klux, and the substrate is a glass substrate, tests are carried out and found respectively, as shown in FIG. 10, wherein (A) picture is used as an image of an optical film with a linear coating line around it. The image shows that there is obvious light at the edge 910 of the optical film, indicating that there will be obvious reflected light or interference. If it is implemented on a photosensitive element, it will cause an image deviation of quality; (B) picture is the image figure of the optical film that uses the present invention to make the peripheral coating line be the zigzag line, and this image figure shows that there is no obvious bright light at the edge line 920 of the optical film, which means that there is no obvious light reflection or interference at this place and if it is applied to the photosensitive element, will not affect the image quality.

According to the anti-scattering and anti-interference coating pattern structure of the optical film of the present invention, its coating line is an optical film with a non-linear zigzag edge or a multi-curved edge, or an annular mask with a zigzag inner edge line, the system can be formed directly on substrates such as wafer, glass, quartz, wafer, sapphire or blue glass.

According to the optical film of anti-scattering and anti-interference coating pattern structure of the present invention, the patterned lines of its optical film or annular mask can also be various triangles, various rectangles, semicircles, various pentagons, hexagon or other polygon.

The anti-scattering and anti-interference coating pattern structure of the optical film of the present invention has an optical film with non-linear zigzag edges or multi-curved edges, which can be applied to various types of films with a thickness of more than 1 nm or layers of more than one layer.

In conclusion, the optical film of anti-scattering and anti-interference coating pattern structure of the present invention has neither been seen in any publications nor has any similar product on the market. Therefore, its novelty should have no doubt. In addition, the unique features and functions of the present invention are far beyond what is conventionally used, so it is indeed more progressive than conventionally used, and it complies with the requirements of the Patent Law on the application requirements for invention patents, then the patent application is legally filed.

The above are only preferred embodiments of the present invention, and the scope of the present invention can not be limited with this, that is, the simple equivalent changes and modifications made according to the patent scope of the present invention and the contents of the description, should still belong to the scope covered by the patent of the present invention.

What is claimed is:

1. An anti-scattering and anti-interference coating pattern structure of an optical film, which is to form at least one optical film on a substrate, wherein:
    coating lines around the optical film are patterned coating lines; such that when the optical film is used for a light sensor, the direction of light reflection can be controlled by the patterned non-linear coating lines to reduce the influence of stray light on the light sensor, and thus the optical film has the functions of anti-scattering and anti-interference.

2. The anti-scattering and anti-interference coating pattern structure of the optical film as claimed in claim 1, wherein the patterned non-linear coating lines are non-linear zigzag lines or multi-curved lines.

3. The anti-scattering and anti-interference coating pattern structure of the optical film as claimed in claim 1, wherein the optical film with patterned non-linear coating lines are formed on substrate such as wafers, glass, quartz, sapphire or blue glass.

4. The anti-scattering and anti-interference coating pattern structure of the optical film as claimed in claim 1, wherein the patterned non-linear coating lines are of the optical film is triangular, various rectangles, semicircles, various pentagons, hexagons or other curved lines that are not a single straight line.

5. The anti-scattering and anti-interference coating pattern structure of the optical film as claimed in claim 1, wherein the patterned non-linear coating lines can be applied to a thickness of more than 1 nm or a optical film having a plurality of layers.

6. An anti-scattering and anti-interference coating pattern structure of an optical film, which is to form an optical film on a substrate, wherein:
    a periphery of said optical film forms an annular mask, and the annular mask covers a peripheral coating line of the optical film, an inner edge of said annular mask is a patterned non-linear inner edge line; thereby a direction of light reflection can be controlled by the patterned non-linear inner edge line of the annular mask.

7. The anti-scattering and anti-interference coating pattern structure of the optical film as claimed in claim 6, wherein the optical film and the annular mask can be respectively formed on a substrate, and then the two substrates are bonded to form a composition of optical film.

8. The anti-scattering and anti-interference coating pattern structure of the optical film as claimed in claim 6, wherein the patterned non-linear inner edge line of the pattern is a non-linear zigzag line or a multi-curved line.

9. The anti-scattering and anti-interference coating pattern structure of the optical film as claimed in claim 6, wherein the optical film with an annular mask with a patterned non-linear inner edge, is formed on substrate such as wafers, glass, quartz, sapphire or blue glass.

10. The anti-scattering and anti-interference coating pattern structure of the optical film as claimed in claim 6, wherein the patterned non-linear inner edge line of the annular mask is triangular, various rectangles, semicircles, various pentagons, hexagons or other curved lines that are not a single straight line.

11. The anti-scattering and anti-interference coating pattern structure of the optical film as claimed in claim 6, wherein the patterned non-linear inner edge line can be applied to a thickness of more than 1 nm or a optical film having a plurality of layers.

\* \* \* \* \*